United States Patent
Hamada (10) Patent No.: US 10,154,459 B2
(45) Date of Patent: Dec. 11, 2018

(54) COMMUNICATION APPARATUS, CONTROL METHOD FOR COMMUNICATION APPARATUS, COMMUNICATION SYSTEM, AND PROGRAM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/621,326

(22) Filed: Jun. 13, 2017

(65) Prior Publication Data
US 2017/0280391 A1 Sep. 28, 2017

Related U.S. Application Data

(63) Continuation of application No. 15/133,736, filed on Apr. 20, 2016, now Pat. No. 9,713,089, which is a continuation of application No. 14/375,848, filed as application No. PCT/JP2013/000199 on Jan. 17, 2013, now Pat. No. 9,344,152.

(30) Foreign Application Priority Data

Jan. 31, 2012 (JP) ................... 2012-018416

(51) Int. Cl.
*H04W 52/02* (2009.01)
*G06F 1/32* (2006.01)
*H04B 1/401* (2015.01)
*H04B 5/00* (2006.01)
(Continued)

(52) U.S. Cl.
CPC ...... *H04W 52/0229* (2013.01); *G06F 1/3225* (2013.01); *G06F 1/3278* (2013.01); *G06F 1/3287* (2013.01); *H04B 1/401* (2013.01); *H04B 5/0031* (2013.01); *H04W 4/80* (2018.02); *H04W 36/36* (2013.01); *H04W 52/0209* (2013.01); *Y02D 10/157* (2018.01); *Y02D 10/171* (2018.01); *Y02D 70/00* (2018.01); *Y02D 70/142* (2018.01); *Y02D 70/166* (2018.01); *Y02D 70/22* (2018.01); *Y02D 70/42* (2018.01)

(58) Field of Classification Search
CPC .............. H04W 52/0229; G06F 1/3225
See application file for complete search history.

(56) References Cited

U.S. PATENT DOCUMENTS

2002/0141095 A1* 10/2002 Yahiro ............ H04W 28/10 360/69
2011/0065460 A1* 3/2011 Kimishima ........ G01C 17/38 455/457

FOREIGN PATENT DOCUMENTS

| JP | 2005333184 A | 12/2005 |
| JP | 2011-044092 A | 3/2011 |

* cited by examiner

*Primary Examiner* — Tuan H Nguyen
(74) *Attorney, Agent, or Firm* — Canon U.S.A., Inc. IP Division (57) ABSTRACT

A communication apparatus includes a communication unit configured to communicate in a first communication mode in which a memory of the communication apparatus is accessed by another communication apparatus, a detection unit configured to detect an access from the another communication apparatus to the memory of the communication apparatus, and a shift unit configured to shift an operation mode of the communication apparatus in response to a condition including at least the access to the memory detected by the detection unit.

22 Claims, 7 Drawing Sheets

(51) Int. Cl.
*H04W 36/36* (2009.01)
*H04W 4/80* (2018.01)

| Address | Define |
|---|---|
| 0x0000 | System define block ( xxxx area ) |
| 0x0010 | Area define block ( xxxx area ) |
| 0x0020 | Area define block ( xxxx area 0001 ) |
| 0x0030 | Service block1 ( xxxx area 0001 ) |
| 0x0040 | CPID data block |
| 0x0050 | Service block2 ( xxxx area 0001 ) |
| 0x0060 | Data block0 ( xxxx area 0001 ) |
| 0x0070 | Data block1 ( xxxx area 0001 ) |
| 0x0080 | Data block2 ( xxxx area 0001 ) |
| 0x0090 | Data block3 ( xxxx area 0001 ) |
| 0x00A0 | PIN service block ( xxxx area 0001 ) |
| 0x00B0 | PIN data block |
| 0x00C0 | Area define block ( xxxx area 0002 ) |
| 0x00D0 | Service block1 ( xxxx area 0002 ) |
| 0x00E0 | CPID data block |
| 0x00F0 | Service block2 ( xxxx area 0002 ) |
| 0x0100 | Data block0 ( xxxx area 0002 ) |
| 0x0110 | Data block1 ( xxxx area 0002 ) |
| 0x0120 | Data block2 ( xxxx area 0002 ) |
| 0x0130 | Data block3 ( xxxx area 0002 ) |
| 0x0140 | PIN service block ( xxxx area 0002 ) |
| 0x0150 | PIN data block |
| 0x0160 | Area define block ( xxxx area 0003 ) |
| 0x0170 | Service block1 ( xxxx area 0003 ) |
| 0x0180 | CPID data block |
| 0x0190 | Service block2 ( xxxx area 0003 ) |
| 0x01A0 | Data block0 ( xxxx area 0003 ) |
| 0x01B0 | Data block1 ( xxxx area 0003 ) |
| 0x01C0 | Data block2 ( xxxx area 0003 ) |
| 0x01D0 | Data block3 ( xxxx area 0003 ) |
| 0x01E0 | PIN service block ( xxxx area 0003 ) |
| 0x01F0 | PIN data block |

COMMUNICATION APPARATUS, CONTROL METHOD FOR COMMUNICATION APPARATUS, COMMUNICATION SYSTEM, AND PROGRAM

CROSS-REFERENCE TO RELATED APPLICATIONS

This application a Continuation of U.S. patent application Ser. No. 15/133,736, filed Apr. 20, 2016; which is a Continuation of U.S. patent application Ser. No. 14/375,848, filed Jul. 31, 2014, now becomes a U.S. Pat. No. 9,344,152, issued May 17, 2016; which is a National Stage Entry of International Application No. PCT/JP2013/000199, filed Jan. 17, 2013, which claims the benefit of Japanese Patent Application No. 2012-018416, filed Jan. 31, 2012, all of which are hereby incorporated by reference herein in their entirety.

TECHNICAL FIELD

The present invention relates to a communication apparatus and a communication system.

BACKGROUND ART

Near field communication (NFC) is defined as the communication standard for the close proximity wireless communication technology. As the communication mode used between apparatuses, NFC defines the following three modes: the card emulation function that allows the user to use an apparatus as an integrated circuit (IC) card, the reader/writer function that writes and reads data to and from an IC card, and the terminal-to-terminal communication function that carries out two-way communication between NFC-compatible apparatuses.

NFC also defines a capability used by an apparatus on the connection requesting side (link activating side) to obtain information about a mode and a protocol supported by an apparatus on the other end (link activated side). Based on the obtained mode and the protocol supported by the apparatus on the other end, NFC defines a capability used by the apparatus on the connection requesting side to select and set a mode and a protocol that the apparatus is to use (ETSI TS 102 622 "Smart cards; UICC—Contactless Front-end (CFL) Interface; host controller Interface" Technical Specification)

NFC defines two operation modes: one is the mode (active mode) in which the NFC interface operation is performed with the power supplied from an apparatus itself and the other is the mode (passive mode) in which the NFC interface operation is performed with the power (induced electromotive force) supplied from another apparatus. Usually, the NFC communication via the card emulation function operates in the passive mode.

A technology is discussed in which a universal integrated circuit card (UICC), a smart card used in a mobile phone, is activated upon detection of proximity to another device (proximity determination by the detection of induced electromotive force). Another technology is discussed in which a contactless IC card file system service, included in a UICC, is activated upon detection of proximity to another device.

A still another technology is discussed in which the NFC interface operation of an apparatus is changed to the active mode (the mode in which the NFC interface operation is performed by the power supplied from the apparatus itself) upon detection of the absence of radio waves in the NFC interface (proximity determination by the detection of the absence of induced electromotive force) (Japanese Patent Application Laid-Open No. 2010-273373)

A mobile apparatus, in which NFC is installed, usually includes a host processor that controls the entire apparatus and a large scale integration (LSI) that controls the NFC interface. To perform the reader/writer emulation function and the terminal-to-terminal communication function in this configuration, the apparatus needs to start the host processor, which controls the entire apparatus, to start a corresponding application. On the other hand, the apparatus can perform the card emulation function, capable of operating in the passive mode, to communicate with an apparatus at the other end without having to start the host processor. In addition, the mobile phone, which performs communication via NFC as a link-activated apparatus, needs to have its host processor placed in the started state to notify the link activating side that the reader/writer emulation function and the terminal-to-terminal communication function are supported on the mobile apparatus.

However, from a power consumption point of view, it is undesirable to start power-consuming hardware, such as the host processor, each time communication is performed via NFC (proximity is detected) to support the modes. For example, to communicate with an apparatus at the other end to perform the card emulation function only, the host processor does not need to be started each time communication is performed via NFC. Therefore, from a power consumption point of view, it is desirable that power-consuming hardware, such as the host processor, be started only when needed during NFC communication.

SUMMARY OF INVENTION

According to an aspect of the present invention, an image forming apparatus includes communication means configured to communicate in a first communication mode in which a memory of the communication apparatus is accessed by another communication apparatus, detection means configured to detect an access from the another communication apparatus to the memory of the communication apparatus, and shift means configured to shift an operation mode of the communication apparatus in response to a condition including at least the access to the memory detected by the detection means.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

In exemplary embodiments below, a communication system is described in which an operating unit operating in response to the power supplied from an apparatus itself is started when a memory access from another apparatus with a predetermined address specified is detected.

Figure 1:
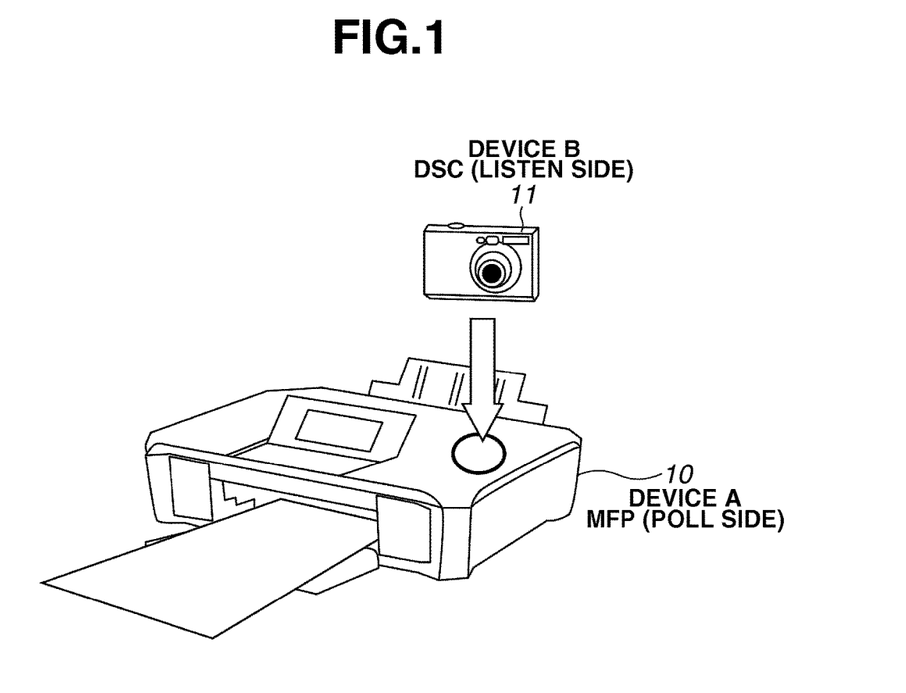
FIG. 1 is a diagram illustrating the configuration of a communication system according to an exemplary embodiment of the present invention.
Figure 2:
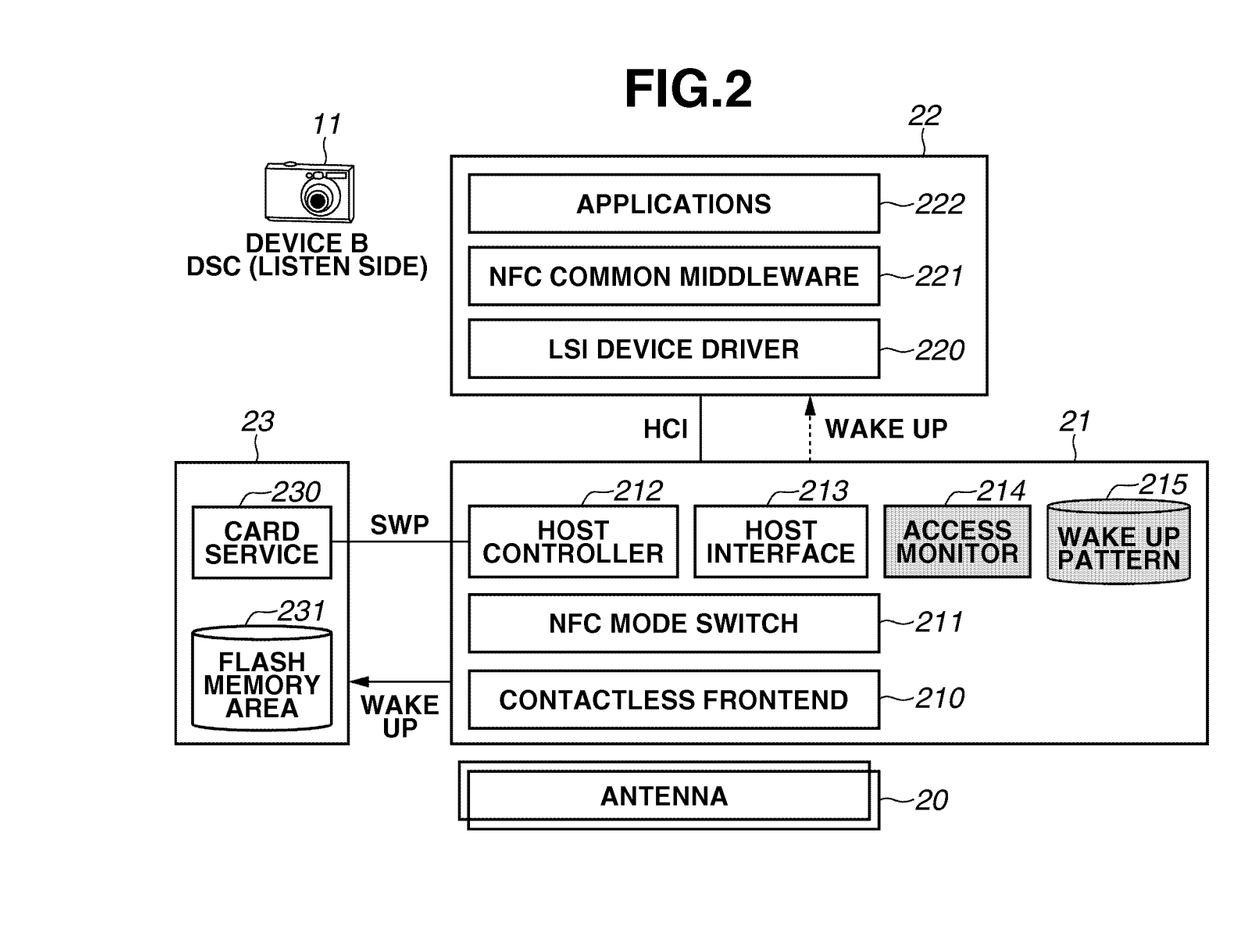
FIG. 2 a block diagram illustrating the functional configuration of a listen side (DSC) device according to the exemplary embodiment of the present invention.
Figure 3:
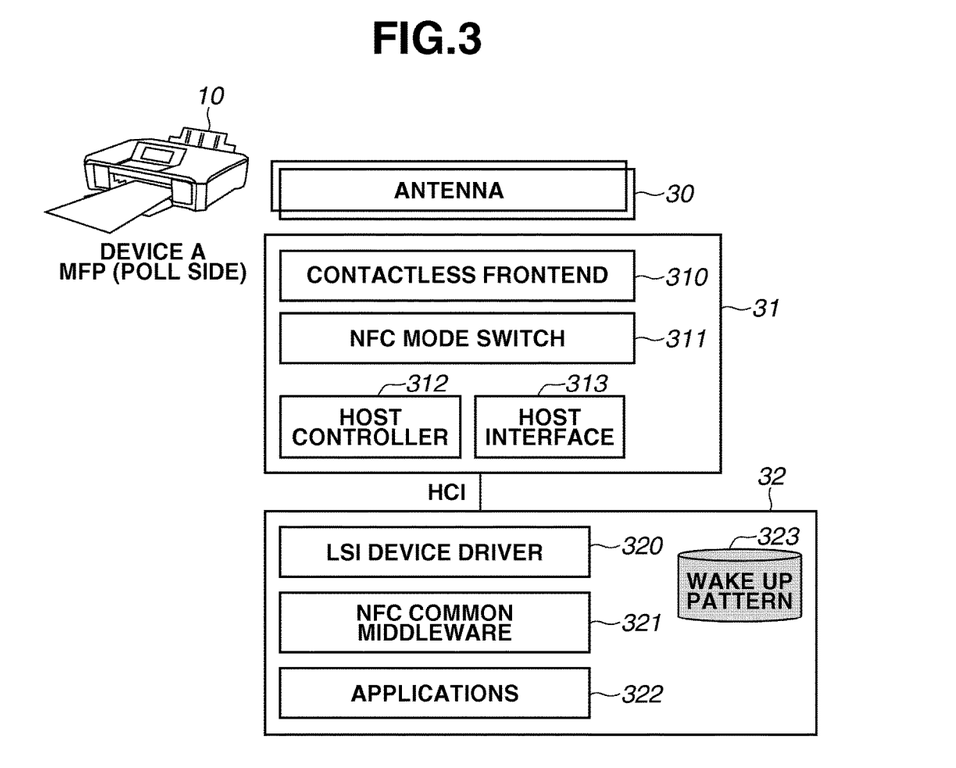
FIG. 3 is a block diagram illustrating the functional configuration of a poll side (MFP) device according to the exemplary embodiment of the present invention.

FIG. 1 is a diagram illustrating the configuration of a communication system according to a first exemplary embodiment of the present invention. In the communication system illustrated in FIG. 1, a device A 10 is a multifunction peripheral (MFP) on the poll side (link activating apparatus). A device B 11 is a digital still camera (DSC) on the listen side (link-activated apparatus). In the present exemplary embodiment, when the device B 11 is placed in proximity to the device A 10, which the device B 11 intends to access as a desired device, the device A 10 starts a host processor of the device B 11, which performs main service processing. FIG. 2 is an example of the block diagram illustrating the functional configuration of the device B 11, and FIG. 3 is an example of the block diagram illustrating the functional configuration of the device A 10. In FIG. 2, the device B 11 includes an antenna 20, a close proximity wireless (NFC) communication control large-scale integration (LSI) 21, a host processor 22, and a contactless IC card service coprocessor 23.

The close proximity wireless communication control LSI 21, which is an LSI for controlling close proximity wireless communication, operates on the power (induced electromotive power) supplied from another device. The close proximity wireless communication control LSI 21 further includes a contactless frontend (wireless control unit) 210, which controls wireless communication, and an NFC mode switch (switching unit) 211, which shifts the operation mode. The close proximity wireless communication control LSI 21 further includes a host controller (host control unit) 212, which communicates with an external processor, and a host interface (interface unit) 213, which is an interface with the external processor.

An access monitor (monitoring unit) 214, which monitors a memory access to the contactless IC card service memory made by other devices, determines whether the memory access is a predetermined memory access that is made based on a predefined address, block, and access pattern. A wakeup pattern storage area 215 stores information on the processing that is performed when a predetermined access to the memory, monitored by the monitoring unit 214, is detected. An example of processing that is performed when a predetermined memory access is detected is that the host processor 22 in the sleep mode (in which the power consumption is reduced) is started to start the terminal-to-terminal communication function via which the terminals can perform two-way communication.

The host processor 22, which operates on the battery (not shown) included in the device B 11, is a processor that controls the entire device. The host processor 22 includes a device driver (driver unit) 220, which controls the close proximity wireless communication control LSI 21 by executing the control program (not shown). The host processor 22 further includes NFC common middleware (NFC control unit) 221, which controls each of the operation modes of close proximity wireless communication, and applications (application unit) 222, which control services to be executed.

The contactless IC card service coprocessor 23, which operates on the power (induced electromotive force) supplied from another device, performs the IC card service provided by the card emulation function. During the IC card service provided by the card emulation function, an access (read/write) is made by another device with an address (block) in the memory (storage unit) specified. The contactless IC card service coprocessor 23 includes a card service (card service control unit) 230, which performs various types of control during the IC card service. The contactless IC card service coprocessor 23 further includes a flash memory area (storage unit) 231, in which information is stored.

When the host processor 22 of the device B 11 is in the sleep mode, only the card emulation function is a usable operation mode. To support the reader/writer emulation function and the two-way communication function, the host processor 22 needs to be in the started state (active mode, which is a non-sleep mode).

In FIG. 3, the device A 10 includes an antenna 30, a close proximity wireless (NFC) communication control LSI 31, and a host processor 32. The close proximity wireless communication control LSI 31 can supply power (generate induced electromotive power) to another device. The close proximity wireless communication control LSI 31 includes a contactless frontend (wireless control unit) 310, which controls wireless communication control, and an NFC mode switch (switching unit) 311, which shifts the operation mode. The close proximity wireless communication control LSI 31 further includes a host controller (host control unit) 312, which communicates with an external processor, and a host interface 313, which is an interface with the external processor.

The host processor 32 is a processor that controls the entire device. The host processor 32 includes a device driver (driver unit) 320, which controls the close proximity wireless communication control LSI 31 by executing the control program (not shown). The host processor 32 further includes NFC common middleware (NFC control unit) 321, which controls each of the operation modes of close proximity wireless communication, and applications (application unit) 322, which control services to be executed. The host processor 32 further includes a wakeup pattern storage area 323, which stores information associated with processing that is performed when a predetermined memory access to the storage unit 231 of the device B 11 is detected. The information stored in the wakeup pattern storage area 215 of the device B 11 and the information stored in the wakeup pattern storage area 323 of the device A 10 are associated with each other.

Figure 4:
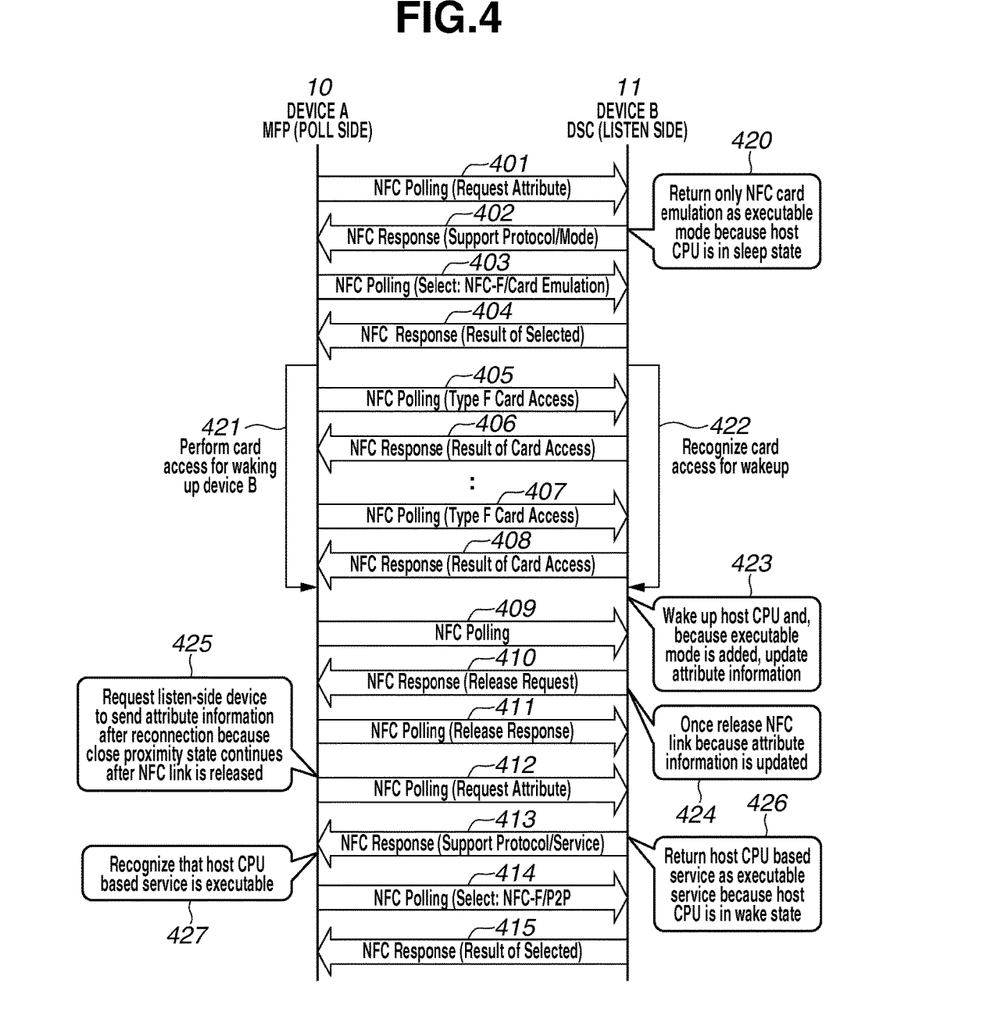
FIG. 4 is a control sequence diagram according to the exemplary embodiment of the present invention.
Figure 5:
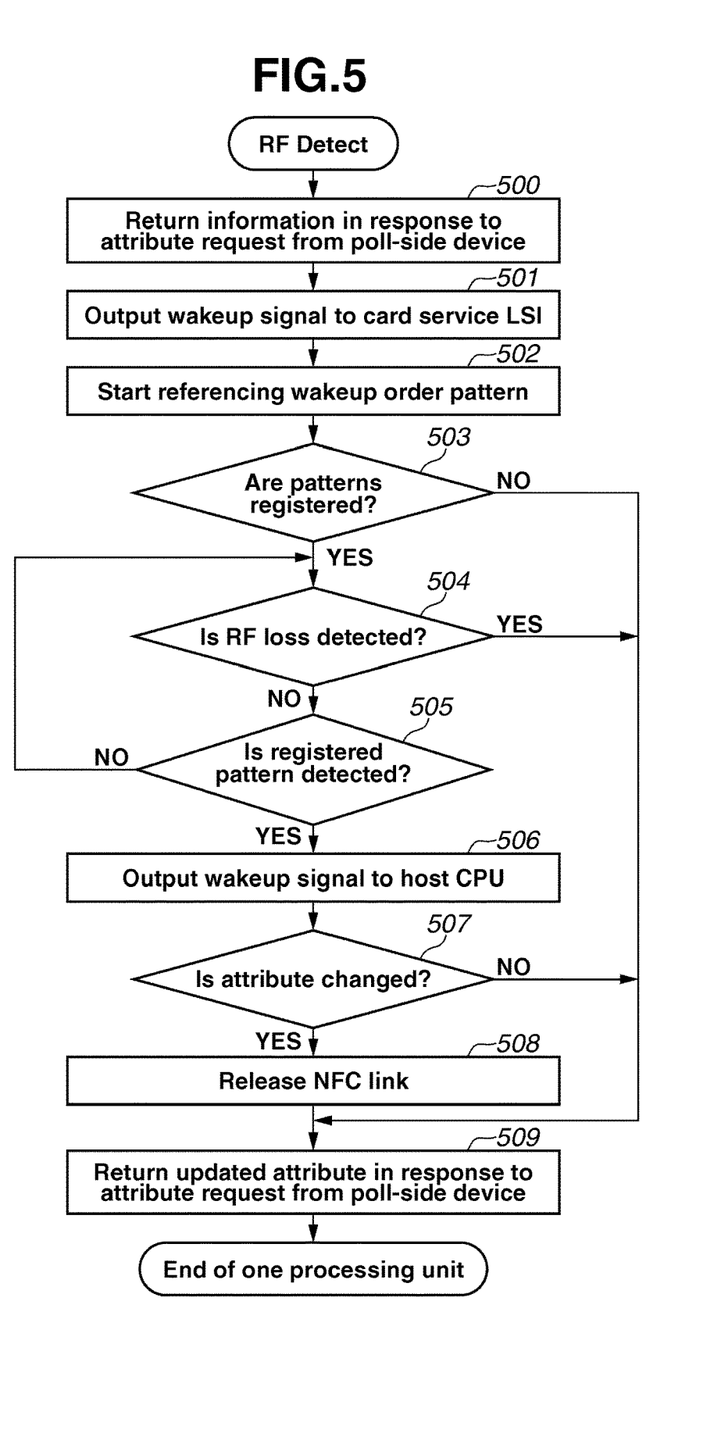
FIG. 5 is a flowchart illustrating the processing concept of the listen side (DSC) device according to a first exemplary embodiment of the present invention.
Figure 6:
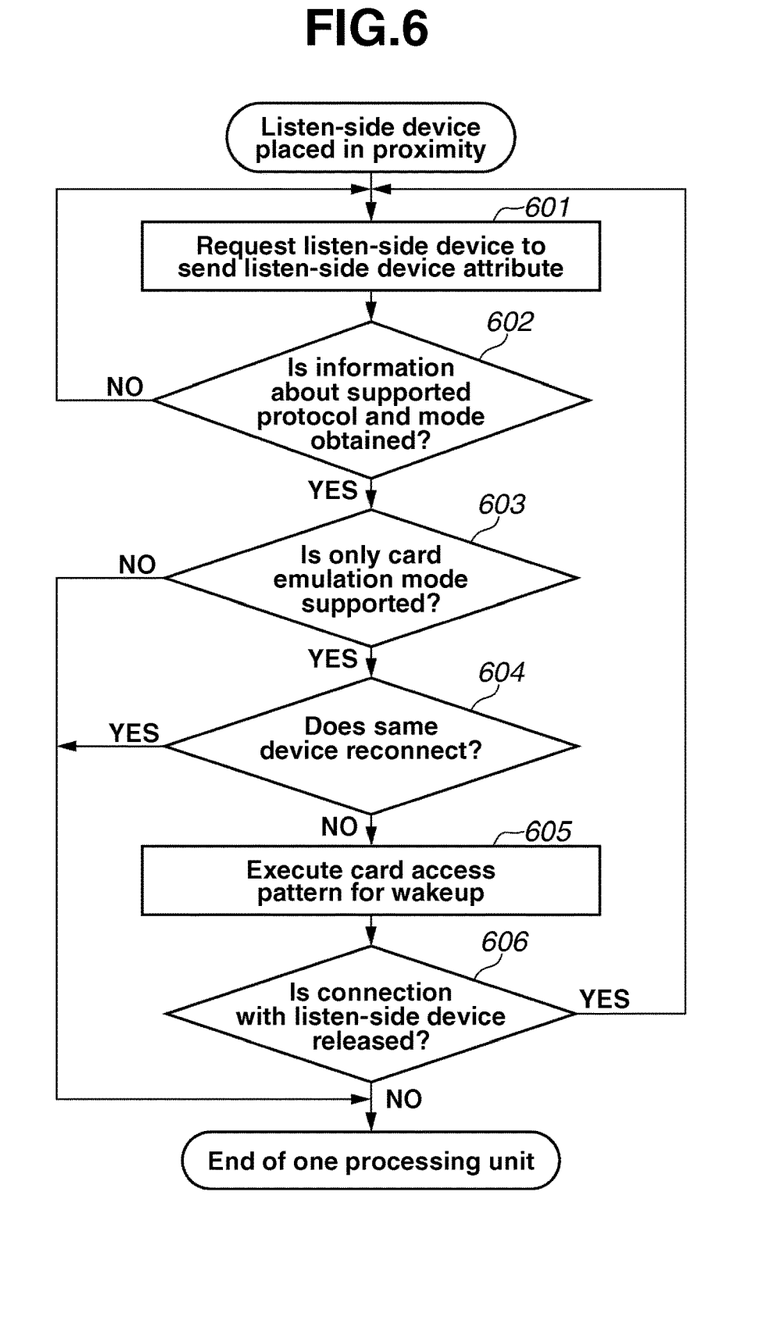
FIG. 6 is flowchart illustrating the processing concept of the poll side (MFP) device according to the first exemplary embodiment of the present invention.

The following describes the operation of the system that has the configuration described above. FIG. 5 is a flowchart illustrating the processing of the device B 11 in the present exemplary embodiment. FIG. 6 is a flowchart illustrating the processing of the device A 10, a poll side device, in the present exemplary embodiment. FIG. 4 is a control sequence diagram of the system operation in the present exemplary embodiment. In the description of the present exemplary embodiment, assume that the device B 11, in which the host processor 22 is not started (in the sleep mode), is placed in proximity to the device A 10. Incidentally, when the device B 11, in which the host processor 22 is started, is placed in proximity to the device A 10, the processing described below is not performed; in that case, the usual NFC connection processing and the communication processing based on the application services between the devices are performed.

In step 401 in FIG. 4 and in step 601 in FIG. 6, the device A 10 intermittently supplies induced electromotive power, and sends an inquiry message (polling), to a listen-side device. This inquiry message is sent to obtain information about the communication protocol supported, and the close proximity communication operation-modes usable, by the listen-side device. In step 602, the device A 10 continues polling until a response is received from the listen-side device. When the user places the device B 11 in proximity to the effective area (within several centimeters) of the induced electromotive power supplied from the device A 10, the device B 11 starts the close proximity wireless communication control LSI 21 operable with the induced electromotive power. In response to the polling from the device A 10, the started close proximity wireless communication control LSI 21 confirms the attribute (information about supported communication protocol and usable close proximity communication operation mode). Because the host processor 22 is in the sleep mode, the close proximity wireless communication control LSI 21 determines that the device B 11 can perform only the card emulation function. After that, the device B 11, which has received the polling including an inquiry about the attribute (received in step 401), returns a response message. In steps 402 and 420 in FIG. 4 and in step 500 in FIG. 5, the device B 11 returns the response message to the device A 10 to notify about the supported communication protocol (NFC A, NFC F) and the usable operation mode (card emulation).

In step 501, the started close proximity wireless (NFC) communication control LSI 21 outputs the wakeup signal to the contactless IC card service coprocessor 23 to start the contactless IC card service coprocessor 23. In step 502, the contactless IC card service coprocessor 23 starts the operation upon receiving the wakeup signal (shifts to the active state) and performs operation for the card emulation function.

On the other hand, in step 603, the device A 10 checks the response message to the polling to determine whether the listen-side device supports only the card emulation function (in other words, whether the listen-side device does not support the terminal-to-terminal communication function and the reader/writer emulation function).

If the mode supported by the listen-side device is not only the card emulation function, the device A 10 terminates the processing. Then, the processing proceeds to the poll-side (starting side of wireless connection) control processing of the usual close proximity wireless (NFC) communication to perform the communication processing according to the service to be executed.

On the other hand, if the listen-side device supports only the card emulation function, then in step 604, the device A 10 determines whether the previously connected listen-side device has reconnected. That the reconnected device supports only the card emulation function means that the device is not a device to be processed in the present exemplary embodiment (for example, an IC card supporting only the card emulation function). Therefore, the device A 10 terminates the processing and the processing proceeds to the poll-side (starting side of wireless connection) control processing of the usual close proximity wireless (NFC) communication to perform the communication processing according to the service to be performed.

If the listen-side device is not a device that has reconnected, then in step 403, the device A 10 sends a message to the device B 11 to instruct the device B 11 to operate under the card emulation function. In addition, the switching unit 311 of the device A 10 sets up the device A 10 to operate under the reader/writer emulation function. Note that the reader/writer emulation function is a mode in which the device A 10 can access another device, which operates under the card emulation function, with a memory address of that device specified.

The switching unit 211 of the device B 11 accepts the communication protocol (NFC F) (card emulation function), specified by the device A 10, and sets up the protocol and the operation mode according to the instruction. In step 404, the device B 11 returns the operation mode setting success response to the device A 10.

However, the applications 322 to be executed in the device A 10 execute a service when the listen-side device is operating in an operation mode other than the card emulation function (for example, terminal-to-terminal communication function). That is, when the device B 11 performs the card emulation function, the applications 322 cannot perform the service. Therefore, the device A 10 is required to perform the processing to change the operation mode of the device B 11 so that the device B 11 can perform the terminal-to-terminal communication function. In other words, the device A 10 causes the device B 11 to start the host processor 22 so that the device B 11 can perform functions other than the card emulation function.

In step 421 (steps 405 to 408) in FIGS. 4 and 605 in FIG. 6, the host processor 32 of the device A 10 executes the contactless IC card service to access the memory of the storage unit 231 of the device B 11 based on the information stored in the wakeup pattern storage area 323.

Figure 7:
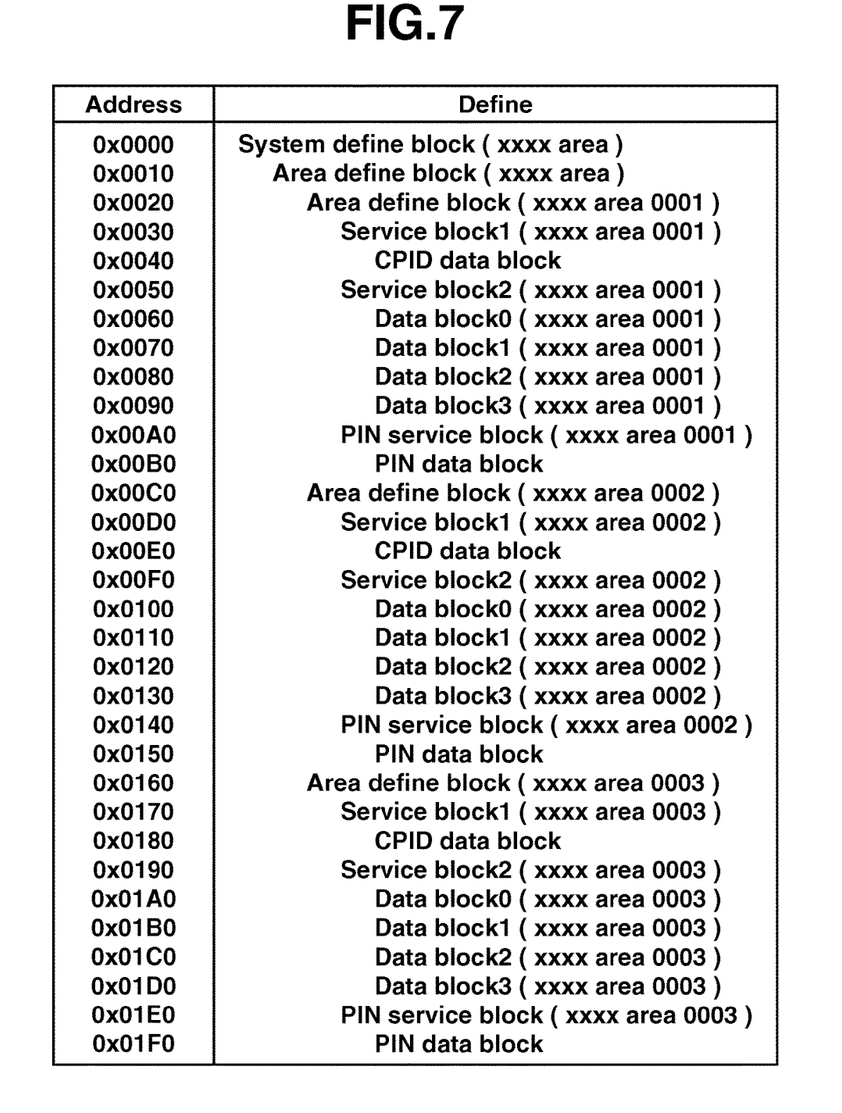
FIG. 7 is a diagram illustrating an example of the definition of the flash memory area for a contactless IC card service according to an exemplary embodiment of the present invention.

The following describes a predetermined memory access to the memory, stored in the wakeup pattern storage areas 323 and 215, with reference to FIG. 7. FIG. 7 is a diagram illustrating an example of the format definition of the flash memory area (storage unit) 231 for the contactless IC card service. FIG. 7 defines the correspondence between the addresses in the storage unit 231 and logical blocks defined for the addresses. A predetermined memory access refers to an access for which an arbitrary access (read, write) to an arbitrary address (block) is defined in advance. For example, a predetermined memory access is an access for writing arbitrary information (for example, a character string "wake") at an arbitrary address (block) (for example, 00x0000). The order in which information is read from, or written to, arbitrary addresses (blocks) may also be defined as a predetermined memory access (for example, information is read from the addresses in order of 00x0000, 00x0010, and 00x01E0).

Next, in step 422 in FIG. 4 and in step 505 in FIG. 5, the monitoring unit 214 of the device B 11 detects whether the memory access from the device A 10 to the storage unit 231 matches an access information entry stored in the wakeup pattern storage area 215. In step 506, if the monitoring unit 214 of the device B 11 detects a predetermined memory access to the storage unit 231, the host controller 212 outputs the wakeup signal to start the host processor 22 (to cancel the sleep mode). Upon receiving the wakeup signal, the host processor 22 of the device B 11 shifts the operation from the sleep mode to the active mode to start the operation.

Once the host processor 22 of the device B 11 is started, the new operation mode (terminal-to-terminal communication function communication mode in the present exemplary embodiment), which is performed via the host processor, can now be supported. In step 423, the host processor 22 updates the device attribute information in the close proximity wireless (NFC) communication control LSI 21 to add the support information about the terminal-to-terminal communication function. In step 424 in FIG. 4 and step 508 in FIG. 5, the close proximity wireless (NFC) communication control LSI 21, which recognizes in step 507 that the attribute information has been updated, once interrupts the connection with the device A 10 to notify the device A 10 about the update of the attribute information.

In step 410, the close proximity wireless (NFC) communication control LSI 21 sends a message to the device A 10 to release (disconnect) the close proximity wireless (NFC) communication line. In step 411, the device A 10 returns a response message. If the release of the connection is detected in step 606, then in step 409, the device A 10 supplies induced electromotive force and, in steps 412 and 425 in FIG. 4 and in step 601 in FIG. 6, performs continual polling to restart inquiring about the device attribute (supported communication protocol/close proximity communication operation mode information). In steps 426 and 413 in FIG. 4 and step 509 in FIG. 5, because the physical proximity-position relation between the device A 10 and the device B 11 remains unchanged even after the connection is released, the device B 11 immediately returns a message in response to the inquiry about the supported communication protocol and the operation mode that have been updated. If the processing to reconnect (an inquiry about usable mode and a response to the inquiry) is not started immediately after the connection, it is considered that a communication error occurs or the physical proximity is lost. In this case, the processing is suspended.

In step 413, the device A 10 receives the message about the supported communication protocol and the operation mode. As a result, in step 427 in FIG. 4 and in step 602 in FIG. 6, the device A10 recognizes that the device B 11 has entered the state in which the terminal-to-terminal communication mode can be performed. The device A 10 terminates the processing because the listen-side device can now operate in a mode other than the card emulation mode. The device A 10 and the device B 11 reconnect with each other in the terminal-to-terminal communication mode. After that, the processing proceeds to the control processing of the activating side of the usual close proximity wireless (NFC) communication connection to carry out communication processing according to the service to be executed.

More specifically, the device A 10 sends a message to the device B 11 to instruct the device B 11 to operate in the terminal-to-terminal communication function operation mode for executing an application service (NFC-Wi-Fi handover, etc.) that is executed in the terminal-to-terminal operation mode. In step 414, the device A 10 puts itself in the terminal-to-terminal operation mode. In step 415, in response to the mode instruction message, the device B 11 puts itself in the terminal-to-terminal communication function operation mode. After that, the communication starts between the device A 10 and the device B 11.

In the present exemplary embodiment, after the communication between the ISI 21 and the coprocessor for the IC card service 23, both of which operate on the power supplied from the other device 10, is carried out, the main processor 22, which requires more power consumption, is started only when a request is received from the other device 10. Therefore, the device 11 drives the processor 22, which operates on the power supplied from the device 11 only when needed, thus reducing the power consumption. That is, the device 11 carries out communication with the power supplied from the other device 10 and, in response to an instruction from the other device 10, supplies the power to start the operating unit (host processor), thus reducing the power consumption.

In addition, even when the device 11 does not support an operation mode corresponding to a service desired by the other device 10, the device 11 can start the operation mode, corresponding to the service desired by the other device 10, via the communication (access to the memory) in the mode supported by the other device 10. A predetermined memory access with an address specified is used as a trigger to start the host processor 22. This memory access eliminates the need for a complex operation, such as packet analysis, which would be required when a start command is issued in which case a start request message is sent and received, thereby reducing the power consumption.

Although the host processor 22 is started in the present exemplary embodiment as the processing that is performed when a predetermined memory access is detected, processing may also be performed according to one of a plurality of different access patterns. For example, an access pattern defining the operation to turn on the power of the device may be used. An access pattern defining the operation to turn on and start hardware other than the processor may also be used. An access pattern defining the execution of a program to execute an application may also be used.

In the first exemplary embodiment, with only the close proximity wireless communication control LSI 21 and the relatively small-power-consuming contactless IC card service coprocessor 23 placed in operation, a notification is sent to the device 11 to notify that the mode or service, in which the more power-consuming host processor 22 operates, needs to be started.

In a second exemplary embodiment, the processing procedure is described for updating and adding predetermined memory access information referenced in the first exemplary embodiment. The predetermined memory access information is the information stored in the wakeup pattern storage areas 215 and 323 included in the device A 10 and device B 11, respectively.

The update processing is performed at the same time during communication to prevent inconsistency in the predetermined memory access information between the devices. The update processing includes the processing for adding a predetermined memory access as well as the processing corresponding to the predetermined memory access to the predetermined access information.

In the present exemplary embodiment, assume that the device A 10 and the device B 11 are communicating via the terminal-to-terminal communication function. During the communication, applications 222 operating in the host processor 22 requests the device B 11 to send an information update request to the device A 10. If the information update request from the device B 11 is acceptable, the device A 10 starts the applications 322 to perform the update processing.

In response to the response message indicating that the device A 10 accepts the update processing, the applications 222 sends the update content to the device A 10. When the update content is received, the applications 322, which perform the update processing for the device A 10, cause the close proximity wireless (NFC) communication control LSI 31 to interrupt the connection. When the connection between the device A 10 and the device B 11 is interrupted by the release control processing, the applications 222 and 322 update the storage information in the wakeup pattern storage areas 215 and 323, respectively.

The processing in the present exemplary embodiment allows the devices to perform update processing at the same time, ensuring synchronization of the information about predetermined memory access between the devices. The update processing performed in this way can avoid a risk of device malfunction (in which an access during the usual operation is recognized as a predetermined memory access) that might otherwise occur while updating the predetermined memory access information.

In the example described in the first and second exemplary embodiments, the host processor 22 is started upon detection of a predetermined memory access to allow the device 11 to operate in the terminal-to-terminal communication mode and, after that, the device 11 is reconnected to the other device 10. However, in some cases, a memory access from the other device 10 may sometimes happen to coincide with a predetermined memory access. Therefore, the device may also be configured to detect an event in which an access executed during the usual contactless IC card service coincides with a predetermined memory access and, upon detection, notify about the coincidence to prompt the host processor 22 to return to the sleep state.

For example, assume that a predetermined memory access is detected and the devices reconnect with each other (steps 401 to 413 in FIG. 4) after the terminal-to-terminal communication mode becomes usable; in this case, if no message about the terminal-to-terminal communication mode is received for a predetermined time, the host processor is placed in the sleep mode again. It is also possible to perform the updating described in the second exemplary embodiment. This configuration reduces the possibility that the host processor is inadvertently started by an access executed during the IC card service.

This configuration detects an event, in which an access executed during the contactless IC card service happens to coincide with a predetermined memory access, and causes the host processor to shift again to the sleep mode, thus leading to a reduction in unnecessary power consumption.

As the interface of close proximity wireless communication (NFC), the exemplary embodiment shows an example in which the close proximity wireless communication (near field communication defined by International Organization for Standardization/International Electrotechnical Commission (ISO/IEC) 18092), which operates on the induced electromotive force from the poll-side device, is used. However, the interface is not limited to the one described in this example. Also applicable is a peer-to-peer (P2P) close proximity wireless communication medium, one of close proximity wireless communication media (such as Transfer Jet (registered trademark) and Infrared Data Association (IrDA)), which generates different powers according to the requirements of the interface unit determined by the selected communication mode and protocol.

The predetermined memory access (predetermined storage area) may be an access specifying a predetermined folder or a predetermined file.

The present invention may also be implemented by performing the following processing. That is, software (program) that implements the function of the exemplary embodiments described above is supplied to a system or a device via a network or various types of storage media to cause the computer (or a central processing unit (CPU) or a microprocessor unit (MPU)) of the system or the information processing device to read the program for execution.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus, comprising:
a wireless communication unit configured to perform a close proximity wireless communication with another communication apparatus; and
a shifting unit configured to, in a case where predetermined information is included in information received in a communication with the other communication apparatus, by the wireless communication unit, executed in a state in which execution of a function of performing a wireless communication with the other communication apparatus is restricted, the wireless communication being in conformity with a communication standard different from a communication standard used in the close proximity wireless communication, shift the communication apparatus into a state in which the restriction is canceled, and configured not to shift the communication apparatus into the state in which the restriction is canceled in a case where the predetermined information is not included in the information received in the communication with the other communication apparatus, by the wireless communication unit, executed in the state in which the execution of the function is restricted.

2. The communication apparatus according to claim 1, wherein the function is a handover from the close proximity wireless communication to Wi-Fi communication.

3. The communication apparatus according to claim 1, wherein, in a case where the shifting unit shifts the communication apparatus into the state in which the restriction is canceled, the communication apparatus activates an operating unit configured to operate in response to power supplied from the communication apparatus and configured to control the communication apparatus.

4. The communication apparatus according to claim 3, wherein the operating unit is a processor.

5. The communication apparatus according to claim 3, wherein, in a case where the operating unit is activated, the wireless communication unit becomes able to perform a handover from the close proximity wireless communication to Wi-Fi communication.

6. The communication apparatus according to claim 3, wherein the shifting unit causes activation of the operating unit by causing the wireless communication unit to transmit an activation signal to the operating unit via a signal line via which the wireless communication unit and the operating unit are connected to each other.

7. The communication apparatus according to claim 1, wherein, in a case where the predetermined information is written into a predetermined storage area of a storage unit that the wireless communication unit has, the shifting unit shifts the communication apparatus into the state in which the restriction is canceled.

8. The communication apparatus according to claim 7, wherein, in a case where the predetermined information is not written into the predetermined storage area of the storage unit when in the state in which the execution of the function is restricted, the shifting unit does not shift the communication apparatus into the state in which the restriction is canceled.

9. The communication apparatus according to claim 7, wherein, in a case where the information is written into another storage area that is different from the predetermined storage area, the shifting unit does not shift the communication apparatus into the state in which the restriction is canceled.

10. The communication apparatus according to claim 1, wherein, in a case where the information is written in a predetermined order into a plurality of addresses of a storage unit that the wireless communication unit has, the shifting unit shifts the communication apparatus into the state in which the restriction is canceled.

11. The communication apparatus according to claim 10, wherein, in a case where the information is not written in the predetermined order into the plurality of addresses of the storage unit, the shifting unit does not shift the communication apparatus into the state in which the restriction is canceled.

12. The communication apparatus according to claim 1, wherein, upon shifting by the shifting unit, the communication apparatus carries out a handover from the close proximity wireless communication to Wi-Fi communication.

13. The communication apparatus according to claim 1, wherein wireless communication unit communicates in a card emulation mode stipulated in an NFC standard.

14. The communication apparatus according to claim 1, wherein the wireless communication unit performs communication in conformity with an NFC standard or performs TransferJet (registered trademark) communication.

15. The communication apparatus according to claim 1, wherein the state in which the execution of the function of the communication apparatus is restricted is a power OFF state or a sleep mode.

16. The communication apparatus according to claim 1, wherein the shifting unit shifts the communication apparatus into a power ON state or into an active mode in a case where the predetermined information is included in the information received in the communication with the other communication apparatus, by the wireless communication unit, executed in the state in which the execution of the function of the communication apparatus is restricted.

17. The communication apparatus according to claim 1, wherein the wireless communication in conformity with the communication standard different from the communication standard used in the close proximity wireless communication is Wi-Fi communication.

18. The communication apparatus according to claim 1, wherein, upon shifting by the shifting unit, the communication apparatus sets an operation mode of the communication apparatus to a terminal-to-terminal mode.

19. A method for controlling a communication apparatus that includes a wireless communication unit configured to perform a close proximity wireless communication with another communication apparatus with another communication apparatus, comprising:
   shifting, in a case where predetermined information is included in information received in a communication with the other communication apparatus, by the wireless communication unit, executed in a state in which execution of a function of performing a wireless communication with the other communication apparatus is restricted, the wireless communication being in conformity with a communication standard different from a communication standard used in the close proximity wireless communication, the communication apparatus into a state in which the restriction is canceled; and
   not shifting the communication apparatus into the state in which the restriction is canceled in a case where the predetermined information is not included in the information received in the communication with the other communication apparatus, by the wireless communication unit, executed in the state in which the execution of the function is restricted.

20. The method according to claim 19, wherein the function is a handover from the close proximity wireless communication to Wi-Fi communication.

21. A non-transitory computer-readable storage medium storing a program for causing a computer to implement a method for controlling a communication apparatus that includes a wireless communication unit configured to perform a close proximity wireless communication with another communication apparatus, comprising:
   shifting, in a case where predetermined information is included in information received in a communication with the other communication apparatus, by the wireless communication unit, executed in a state in which execution of a function of performing a wireless communication with the other communication apparatus is restricted, the wireless communication being in conformity with a communication standard different from a communication standard used in the close proximity wireless communication, the communication apparatus into a state in which the restriction is canceled; and
   not shifting the communication apparatus into the state in which the restriction is canceled in a case where the predetermined information is not included in the information received in the communication with the other communication apparatus, by the wireless communication unit, executed in the state in which the execution of the function is restricted.

22. The non-transitory computer-readable storage medium according to claim 21, wherein the function is a handover from the close proximity wireless communication to Wi-Fi communication.

* * * * *